United States Patent [19]

Weiler et al.

[11] 4,325,218

[45] Apr. 20, 1982

[54] VACUUM BRAKE BOOSTER

[75] Inventors: Rolf Weiler; Peter Böhm, both of Frankfurt, Fed. Rep. of Germany

[73] Assignee: ITT Industries, Inc., New York, N.Y.

[21] Appl. No.: 121,349

[22] Filed: Feb. 14, 1980

[30] Foreign Application Priority Data

Mar. 5, 1979 [DE] Fed. Rep. of Germany ....... 2908515

[51] Int. Cl.$^3$ .............................................. B60T 13/00
[52] U.S. Cl. ................................ 60/547 R; 92/98 D; 92/128; 92/165 PR
[58] Field of Search ................ 92/98 D, 165 PR, 166, 92/128; 60/547 R

[56] References Cited

U.S. PATENT DOCUMENTS

| 3,168,855 | 2/1965 | Randol | 92/99 |
| 3,411,409 | 11/1968 | Bunyard | 91/1 |
| 3,525,289 | 8/1970 | Cercone | 92/99 |
| 3,613,506 | 10/1971 | Kytta | 91/369 A |
| 3,981,227 | 9/1976 | Azuma | 92/98 D |

OTHER PUBLICATIONS

Girling—The New Lightweight Generation of Girling Car Brake Actuation Equipment, Jan. 8, 1979.

Lucas Girling—Girling Lightweight Car Brake Actuation Equipment, Jan. 8, 1979.

Primary Examiner—Koraham Hershkovitz
Attorney, Agent, or Firm—John T. O'Halloran; Alfred C. Hill

[57] ABSTRACT

Known vacuum brake boosters are provided with a heavy sheet metal vacuum housing for transmitting reaction forces of the mechanical actuation to the booster carrier plate secured to a vehicle. According to the present invention the weight of the booster is remarkably reduced by providing draw bars for transmitting the reaction forces to the carrier plate inside the vacuum housing parallel to the push rod, penetrating the vacuum piston or movable wall and connecting both transverse end walls of the vacuum housing to the carrier plate. The draw bars are sealed at their point of penetration of the vacuum piston by small rolling membranes which are surrounded by tubular members fastened to the vacuum piston. A base plate assembly is provided including a base plate fastened to the transverse end wall of the vacuum housing adjacent the master cylinder, bolts fastened to one side of the base plate upon which the master cylinder is fastened and the draw bars are fastened to the other side of the base plate.

9 Claims, 8 Drawing Figures

VACUUM BRAKE BOOSTER

BACKGROUND OF THE INVENTION

This invention related to a brake booster for an automotive vehicle utilizing the differential of pressure between a vacuum and atmospheric pressure comprising a vacuum casing with at least one movable wall arranged therein, wherein the movable wall divides the vacuum casing into a vacuum chamber and a working chamber and acts upon a push rod guided in an axial direction of the brake booster, and wherein at least two bars are provided which are connected to the transverse end walls of the vacuum casing, extend essentially parallel to the push rod and penetrate, and are sealed relative to, the movable wall.

Brake boosters of the aforementioned type for automotive vehicles, wherein the differential of pressure between a vacuum and atmospheric pressure is used for the generation of an additional force are known, for example, from German Pat. No. DE-AS 2,345,314. The brake booster comprises a vacuum casing, a wall movably arranged therein, and a control valve. The vacuum casing is of tubular design, its two transverse end walls serving as fastenings. The brake booster conventionally has its one transverse end wall, where the control valve is provided, fastened to the vehicle's splashboard, while the master brake cylinder is fastened to the other transverse end wall of the brake booster. The fastening means are generally bolts arranged in the end walls of the brake booster. A movable wall divides the interior of the vacuum casing into a vacuum chamber in which a constant vacuum prevails and a working chamber in which the pressure is variable dependent upon the control valve. Like the pedal force acting on a push rod via the control valve, the force acting on the movable wall in the presence of a pressure differential is transmitted to the master brake cylinder via the push rod axially disposed in the vacuum casing.

The vacuum casing is conventionally of sheet steel. With the control valve inactivated, the same vacuum will prevail in the vacuum chamber and in the working chamber. As a result of the pressure differential between the atmospheric pressure prevailing outside the vacuum casing and the vacuum, forces will be produced causing a deformation of the vacuum casing. Since there must be a limit to such deformation, the casing parts must be of correspondingly strong design. This is not economic because of increased material costs, and also, the weight of the brake booster would be above a specific minimum value. Thus, the car manufacturers' requirements for lowest possible weight of brake systems while at the same time ensuring the safety and operability of the brake boosters could not be satisfied.

In addition to the forces caused by the pressure differential, further forces transmitted via the push rod occur on brake actuation, i.e., the brake pedal force and the booster force generated by the brake booster. The sum of the forces act on the piston of the master cylinder, generating in the master cylinder a reaction force of the same magnitude, but acting in the opposite direction. This reaction force extends from the master cylinder via the sheet steel parts of the vacuum casing to the splashboard to which the pedal assembly is conventionally fastened. Due to this reaction force, the vacuum casing will be extended on brake actuation in an axial direction, causing displacement of the master cylinder and consequently an increased lost travel of the brake pedal. Because of the brake lever transmission ratio, the extensions of the lower casing shell will be multiplied when transmitted to the brake pedal.

In U.S. copending application Ser. No. 49,706, filed June 18, 1979, assigned to the same assignee as the present application and whose disclosure is incorporated herein by reference at least two bars are connected to the transverse end walls of the vacuum casing, extend essentially parallel to the push rod and penetrate the movable wall which is slidably arranged on the bars by means of slide seals.

SUMMARY OF THE INVENTION

It is an object of the present invention to improve the arrangement of the above-identified copending application, while at the same time maintaining its operability and safety, so as to facilitate assembly and to permit the use of a uniform system for different sizes and also for different attachments.

A feature of the present invention is the provision of a brake booster utilizing the differential of pressure between a vacuum and atmospheric pressure comprising a vacuum casing having at least one movable wall disposed therein, the movable wall dividing the casing into a vacuum chamber and a working chamber and acting upon a push rod guided along a longitudual axis of the casing; and a base plate fastened to a transverse end wall of the casing defining the vacuum chamber, the base plate having at least two bars fastened to one surface thereof extending into the casing substantially parallel to the push rod, penetrating the movable wall in a slidable sealed relationship and connected to the other transverse end wall of the casing defining the working chamber and a plurality of bolts fastened to the other surface thereof upon which a master cylinder is secured to the booster.

The base plate may be arranged either inside or outside the vacuum casing. The base plate is preferably arranged inside the vacuum casing since this arrangement obviates the necessity for a special seal.

The base plate is preferably ribbed to ensure sufficient stiffness while being of low weight. The ribs are directed towards the interior of the vacuum casing. To reduce the weight still further, the bars which are preferably integrally formed with the base plate may be partly hollow in their interior as far as this does not impair their strength. For reasons of manufacture it will be advantageous to design the bars so that they are hollow on the side close to the base plate.

DESCRIPTION OF THE PREFERRED EMBODIMENTS

Figure 1:
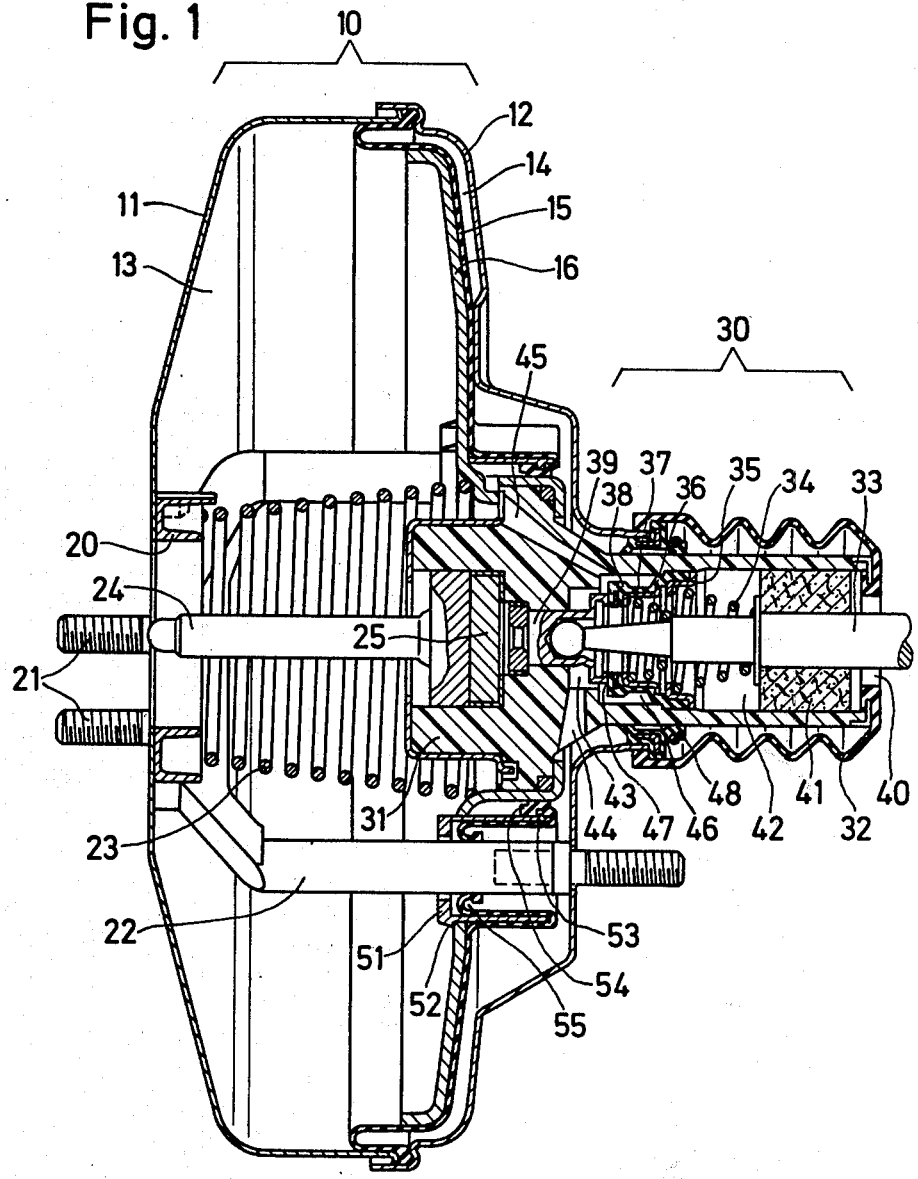
FIG. 1 is a longitudual cross sectional view of a first embodiment of a brake booster in accordance with the principles of the present invention with the base plate assembly being sectioned along line I—I of FIG. 3.
Figure 3:
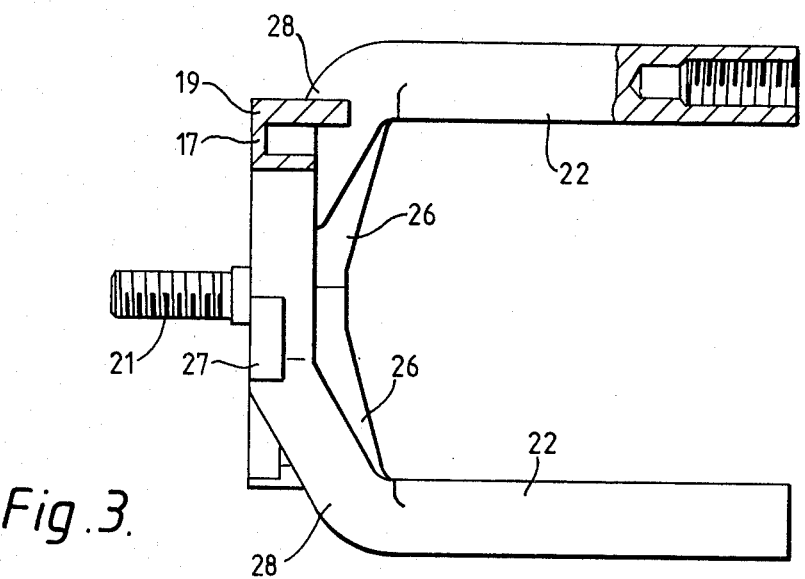
FIG. 3 is an end view of the base plate assembly of FIG. 1 looking from the pedal side of the brake booster within the vacuum casing.
Figure 2:
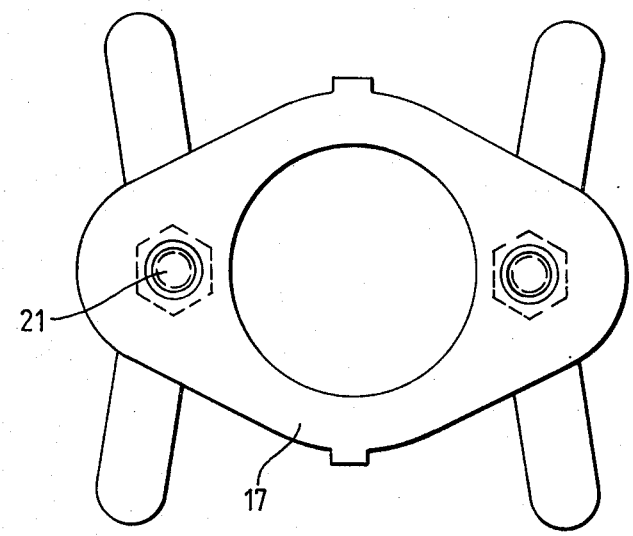
FIG. 2 is an end view of the base plate assembly of FIG. 1 looking from the master cylinder side of the brake booster.
Figure 4:
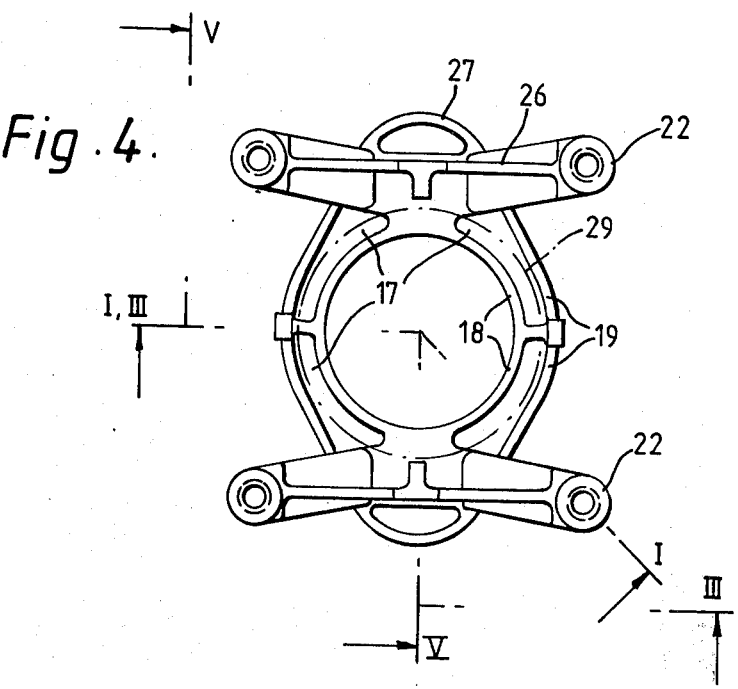
FIG. 4 is a sectional view taken along line IV—IV of FIG. 3.
Figure 5:
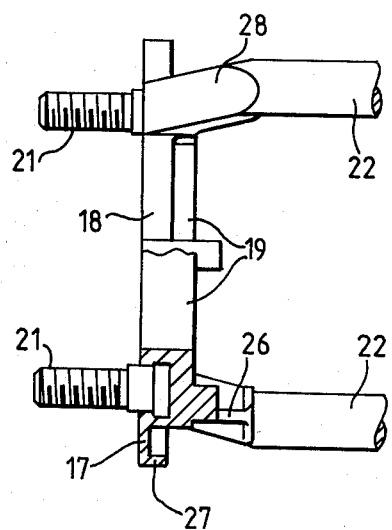
FIG. 5 is a sectional view take along line V—V of FIG. 3.

The vacuum casing 10 of the brake booster illustrated in FIG. 1 includes the two parts 11 and 12 of which part 11 will be referred to as the lower casing shell and part 12 as the upper casing shell in the following. Lower casing shell 11 has a vacuum port (not shown) through which the desired vacuum is produced in vacuum chamber 13. Working chamber 14 is isolated from vacuum chamber 13 by the movable wall including diaphragm plate 16 and rolling diaphragm 15. In the inactivated state, a vacuum will also prevail in working chamber 14. On actuation of control valve 30, a greater or lesser amount of air, depending on the force exerted for actuation, will be admitted into working chamber 14, the air producing via the diaphragm plate 16 a boosting effect of the braking force introduced on the master brake cylinder (Not shown).

Arranged on an end wall of vacuum casing 10, in the embodiment shown on the left-hand end wall, is the base plate 17 of a base plate assembly 20. Bolts 21 arranged to secure the master brake cylinder (not shown) to the brake booster are provided in the basic body. These bolts may be integrally cast with the basic body. In addition, bars 22 projecting out of the end wall of the vacuum casing upper shell 12 are connected to base plate 20 or integrally formed therewith. Piston return spring 23 is provided within a space bounded by bars 22. Push rod 24 is axially slidably arranged in the control housing 31 of valve 30 by the insertion of a disc 25. Disc 25 can at the same time act as a sealing element.

Control housing 31 of control valve 30 is connected to diaphragm plate 16 and is moved therewith axially. A piston rod 33 connected to a brake pedal (not shown) is disposed in control valve 30 on a common axis with push rod 24. Via valve piston 39 and disc 25, the force transmitted via piston rod 33 can directly act on push rod 24. Piston rod 33 is held in its inactivated position by compression spring 34 bearing on supporting ring 35. Via compression spring 36 and sheet steel ring 37, piston rod 33 acts on the movable part of sealing element 38. The valve piston 39 and the elastic sealing element 38 combine to form a poppet valve 47 which is closed in the inactivated position shown. Outside air is allowed to enter ante-chamber 42 via inlet port 40 and filter 41. In the inactivated state of control valve 30, ante-chamber 42 is isolated from annular chamber 43 by the closed poppet valve 47. Chamber 43 is connected to outside air channel 44. Annular chamber 43 is connected to working chamber 14 of the brake booster via outside air channel 44. Vacuum Chamber 13 is connected to annular chamber 43 via vacuum channel 45. In the inactivated position shown, vacuum channel 45 is connected to working chamber 14 via annular chamber 43 and outside air channel 44. Collar seal 48 seals working chamber 14 relative to outside air. Cap 32 protects control housing 31 against damage. The supporting ring 50 contains guide tubes 51. At the lower ends of tubes 51 elastic noses 52 are provided to button supporting ring 50 in diaphragm plate 16. Strips 53 are provided at supporting ring 50 and at guide tubes 51 to fasten the sealing portion 54 of rolling diaphragm 15. Arranged within guide tubes 51 are small rolling diaphragms 55 which serve to seal bars 22 at the point of penetration through diaphragm plate 16.

The mode of operation of this embodiment of the brake booster is as follows. In the inactivated position shown, a vacuum will prevail in vacuum chamber 13 and in working chamber 14. On axial displacement of piston rod 33 to the left, annular chamber 46 is initially isolated from annular chamber 43 by the movable part of sealing element 38. Thus, there is no longer a direct communication between the two chambers 13 and 14. On further movement of piston rod 33, poppet valve 47 will open and the atmospheric pressure prevailing in ante-chamber 42 will be admitted into working chamber 14 via outside air channel 44. The force resulting from the differential of pressure between vacuum chamber 13 and working chamber 14 will act on housing 31 of control valve 30 and thereby on push rod 24, and being additive to the force transmitted by piston rod 33, it will increase the latter. During axial movement of the movable wall including diaphragm plate 16 and rolling diaphragm 15, there occur no sealing problems at the point of penetration of bars 22 through diaphragm plate 16 due to small rolling diaphragms 55. Bars 22 need not be subjected to special treatment as is the case with slide seals.

Base plate assembly 20 constructed in accordance with the principles of the present invention is shown in FIGS. 2 to 5.

A base plate 17 having an opening which conforms to the design of the master brake cylinder to be used possesses inner stiffening rib 18 and outer stiffening rib 19. Bolts 21 are arranged in base plate 17 according to the flange holes of the master brake cylinder. These bolts are usually integrally cast with plate 17. Bars 22 which extend up to the other end wall of the brake booster are connected to the base plate 17 through slanting extensions 28 and are integrally formed with base plate 17. For increased strength, every two bars are connected to each other by ribs 26. In addition, the part of plate 17 projecting beyond extensions 28 is provided with ribs 27. The dot-dash circle 29 (FIG. 4) indicates the place against which piston return spring 23 may bear.

Figure 6:
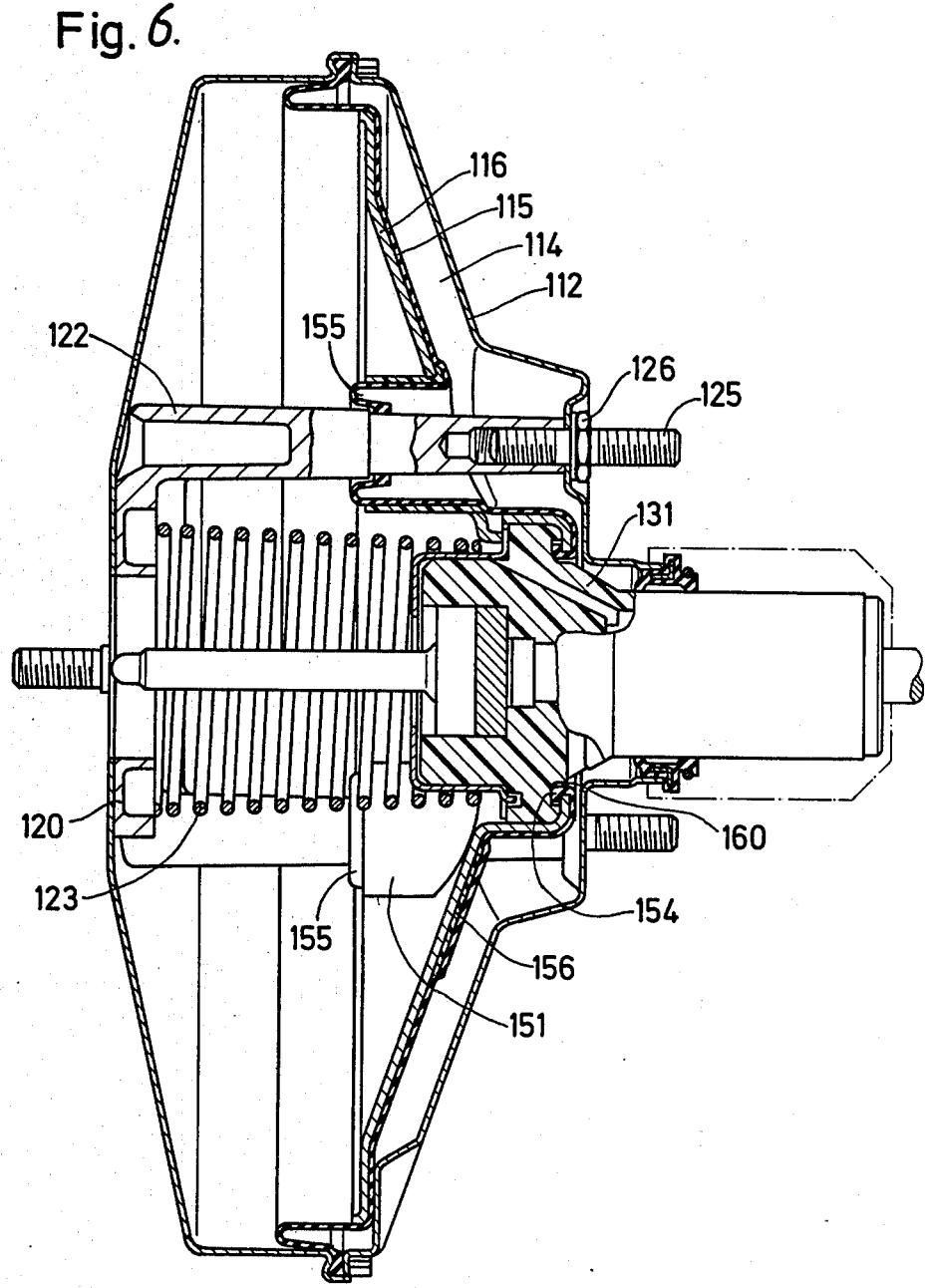
FIG. 6 is a longitudual cross sectional view of second embodiment of a brake booster in accordance with the principles of the present invention with the base plate assembly being sectioned along line VI—VI of FIG. 7.
Figure 7:
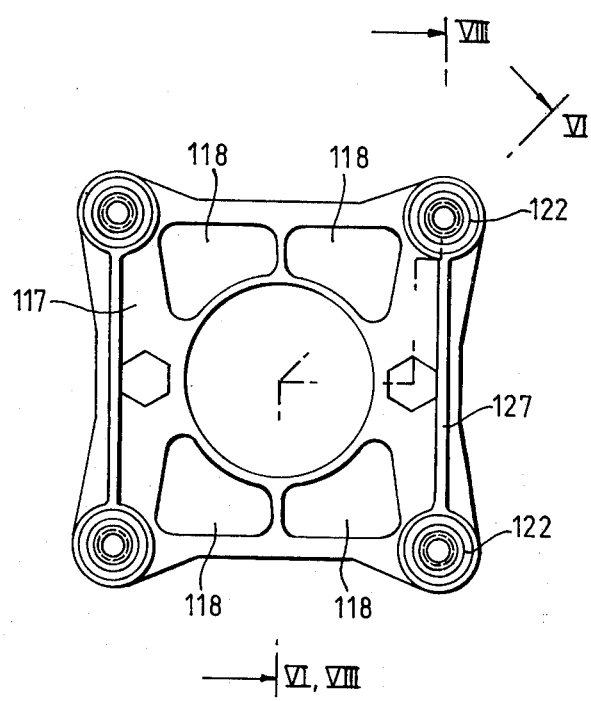
FIG. 7 is an end view of the base plate assembly of FIG. 6 looking from the master cylinder side of the brake booster.
Figure 8:
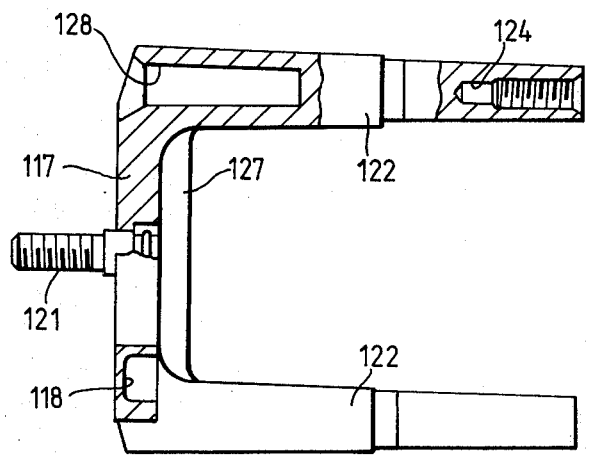
FIG. 8 is a sectional view taken along line VIII—VIII of FIG. 7.

FIGS. 6 to 8 show another embodiment of the brake booster of the present invention. The mode of operation of this embodiment of the brake booster is the same as in the embodiment of FIGS. 1 to 5 so that it need not be described here again.

As shown in FIG. 6, the supporting ring with the guide sleeves is of a different design than that of FIG. 1. The guide sleeves 151 are connected with each other through ring segments. They are so arranged that they lie flat on the sloping diaphragm plate 116, thus forming an enlarged cup spring. Guide sleeves 151 have projections forming a groove for engagement with diaphragm plate 116. FIG. 6 shows clearly how the ring-segment-shaped connecting members lie flat on diaphragm plate 116. On pressurization of working chamber 114, working pressure therein will urge the rolling diaphragm 115 into engagement with diaphragm plate 116.

Rolling diaphragm 115 overlaps diaphragm plate 116 completely. At its inner rim it possesses a sealing portion 154 into which diaphragm plate 116 is slid. Both are inserted into an annular groove 160 of control housing 131 and moved into abutment under load. In contrast to the embodiment of FIG. 1, this arrangement obviates the need for an additional seal between the diaphragm plate and the control housing.

The base plate assembly 120 of the embodiment of FIG. 6 is shown in FIGS. 7 and 8.

A base plate 117 has recesses 118 to reduce its weight. On one side of base plate 117, bars 122 are arranged which extend up to the opposite end wall of the vacuum casing, and on the other side of plate 117 are the bolts 121 to which the master brake cylinder is fastened. Bolts 121 are integrally cast with base plate 117. Every two bars 122 are connected to each other through ribs 127 to ensure a certain amount of stability. To reduce the weight, bars 122 include bores 128 on the end close to base plate 117, provided stability considerations allow this. The other end of bars 122 include threaded bores 124 into which bolts 125 are screwed. By means of nuts 126 the vacuum casing is then urged against bars 122, resulting at the same time in a sealing effect.

This invention is not limited to the embodiments shown but is also suitable for use in other embodiments.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster utilizing the differential of pressure between a vacuum and atmospheric pressure comprising:

a vacuum casing having at least one movable wall dividing said casing into a vacuum chamber and a working chamber and acting upon a push rod guided along a longitudinal axis of said casing; and a base plate assembly distinct from said casing including a base plate disposed in said vacuum chamber having one surface thereof abutting one transverse end wall of said casing defining said vacuum chamber and another surface thereof parallel to and spaced from said one surface within said vacuum chamber, said another surface having at least two bars integrally formed therewith, said two bars extending into said casing substantially parallel to said push rod, penetrating said movable wall in a slidable sealed relationship and connected to the other transverse end wall of said casing defining said working chamber and to a vehicle member, said one surface having a plurality of bolts integrally formed therewith upon which a master cylinder is secured to said booster, said plurality of bolts extending through said one transverse end wall.

2. A booster according to claim 1, further including a return spring for said movable wall bearing against said base plate.

3. A booster according to claim 1, wherein said bars are at least partially hollow.

4. A booster according to claim 3, wherein said bars are partially hollow adjacent said base plate.

5. A booster according to claim 1, wherein said base plate is formed with a plurality of stiffening ribs.

6. A booster according to claim 5, wherein said plurality of ribs are directed towards the interior of said casing.

7. A booster according to claim 5, wherein said plurality of ribs are disposed in only one surface of said base plate.

8. A booster according to claim 5, wherein said bars number four, and at least certain of said plurality of ribs extend between each pair of said bars.

9. A booster according to claim 5, wherein one of said plurality of ribs extend between said two bars.

* * * * *